Dec. 29, 1970  A. S. ROBERTS  3,550,198
APPARATUS FOR COMPACTING FINELY-GRANULATED MATERIALS
Filed Dec. 22, 1967  8 Sheets-Sheet 2

INVENTOR
ALBERT S. ROBERTS
BY

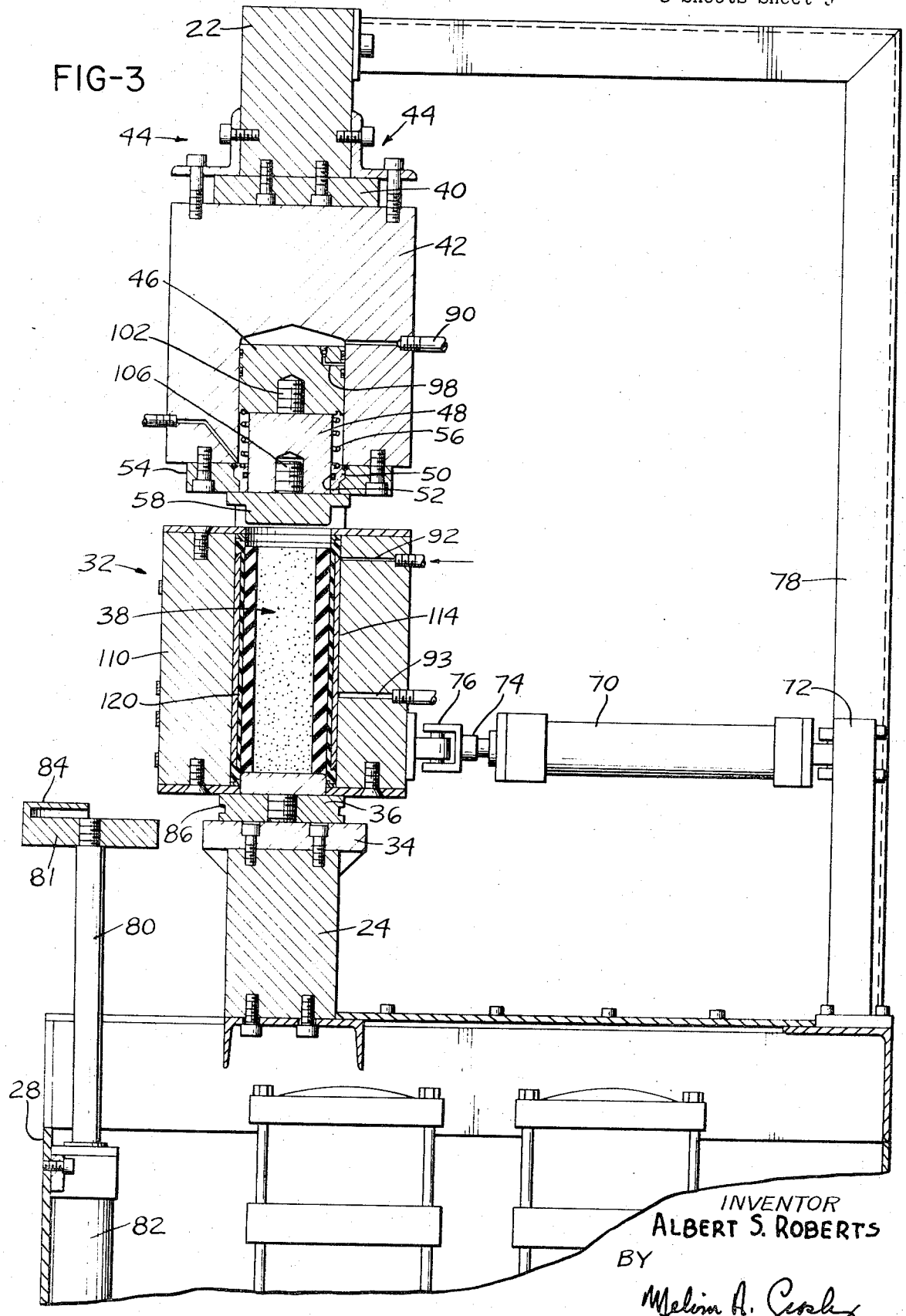

Dec. 29, 1970     A. S. ROBERTS     3,550,198
APPARATUS FOR COMPACTING FINELY-GRANULATED MATERIALS
Filed Dec. 22, 1967     8 Sheets-Sheet 4
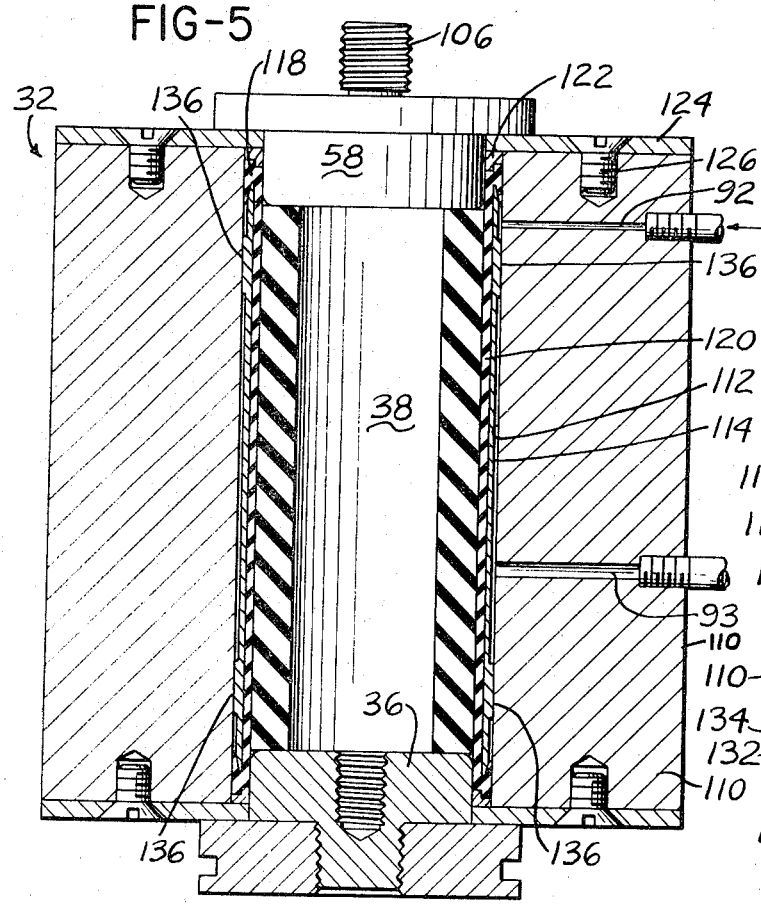
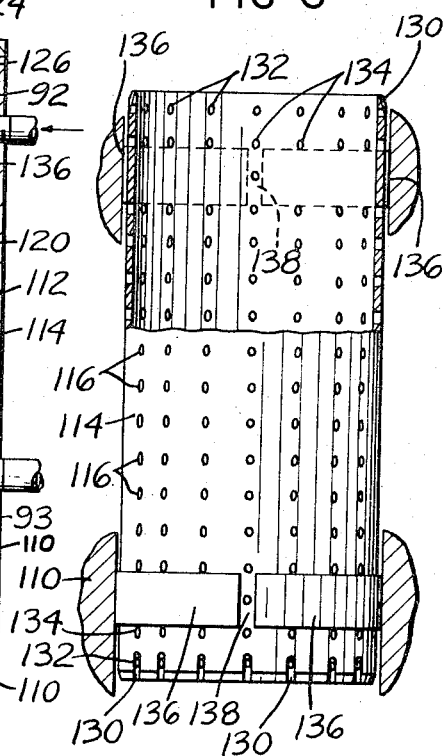
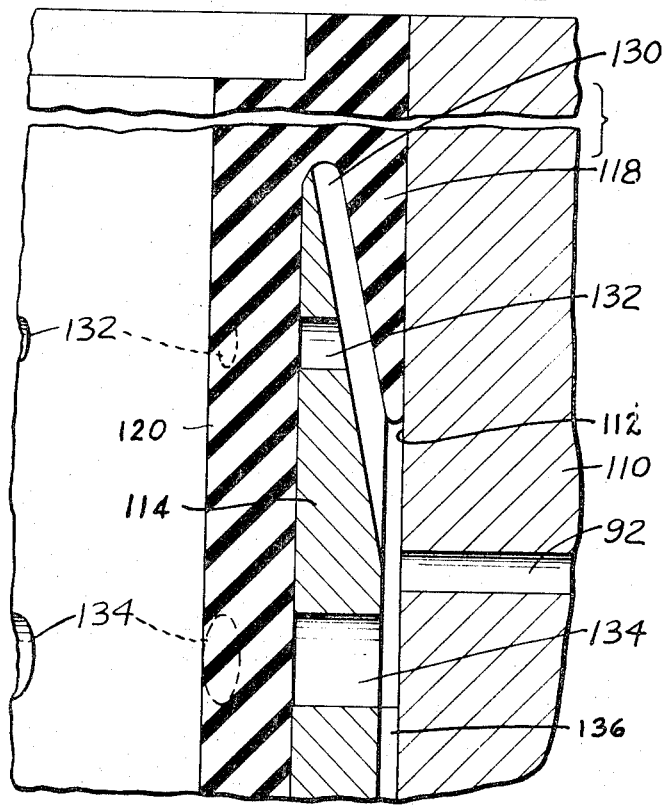
INVENTOR
BY ALBERT S. ROBERTS

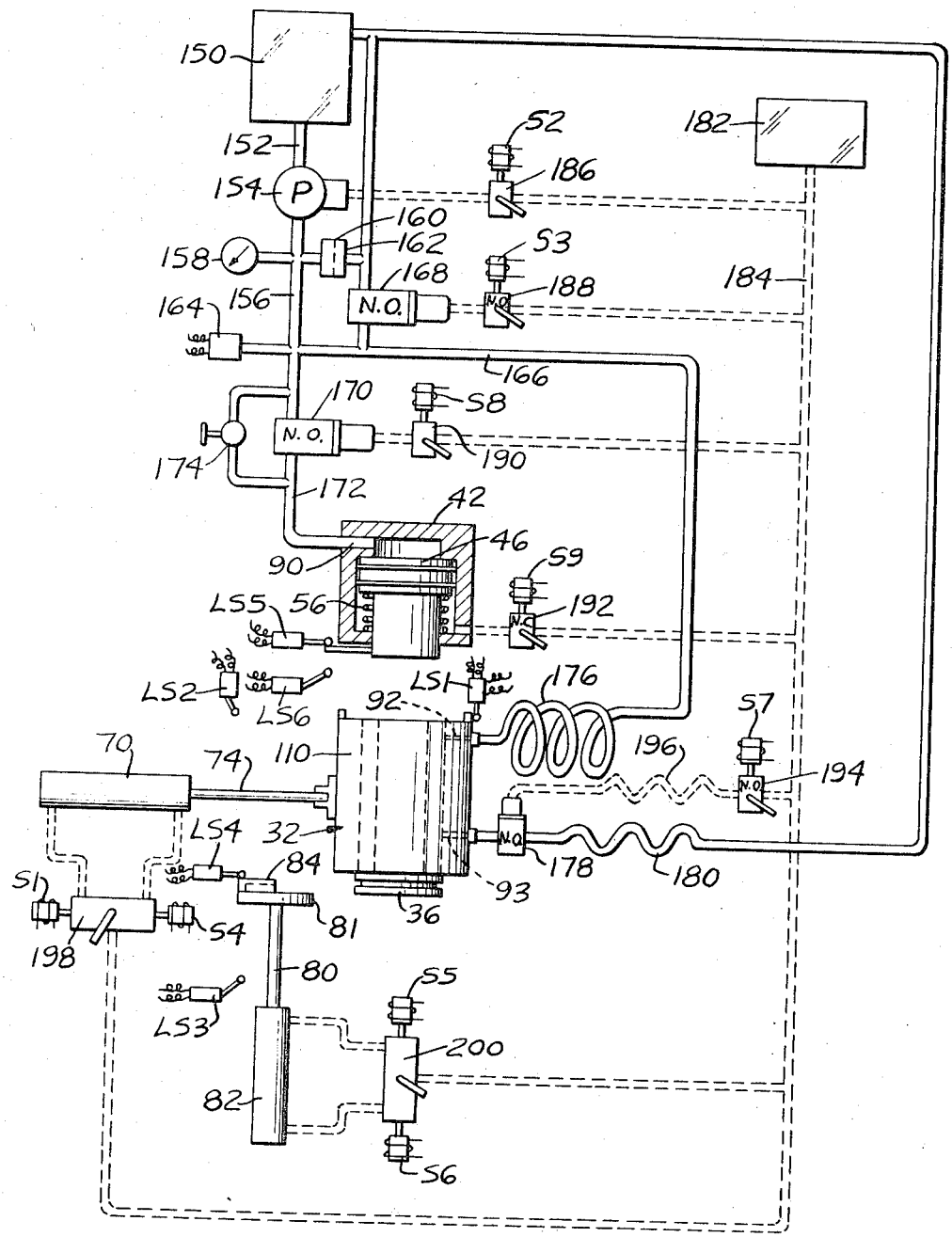

Dec. 29, 1970     A. S. ROBERTS     3,550,198
APPARATUS FOR COMPACTING FINELY-GRANULATED MATERIALS
Filed Dec. 22, 1967     8 Sheets-Sheet 7
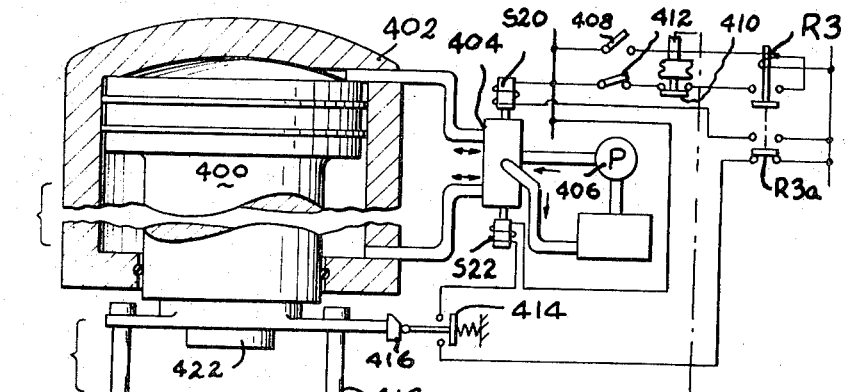
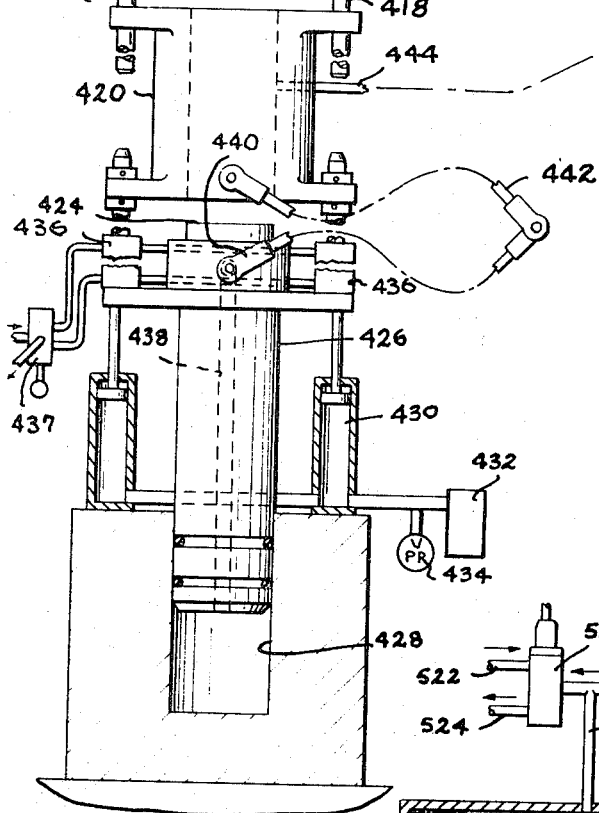
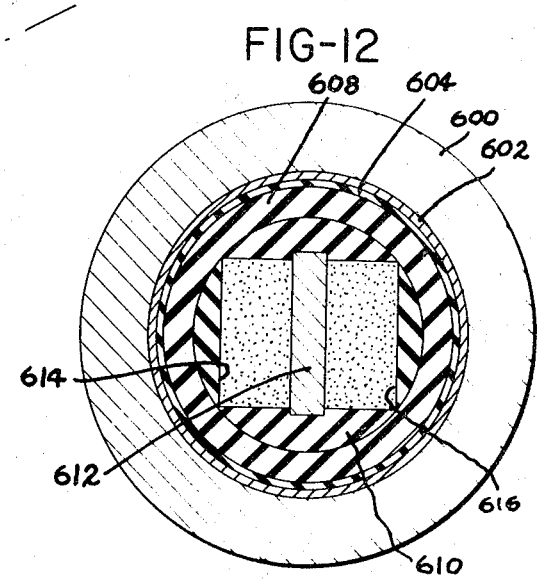
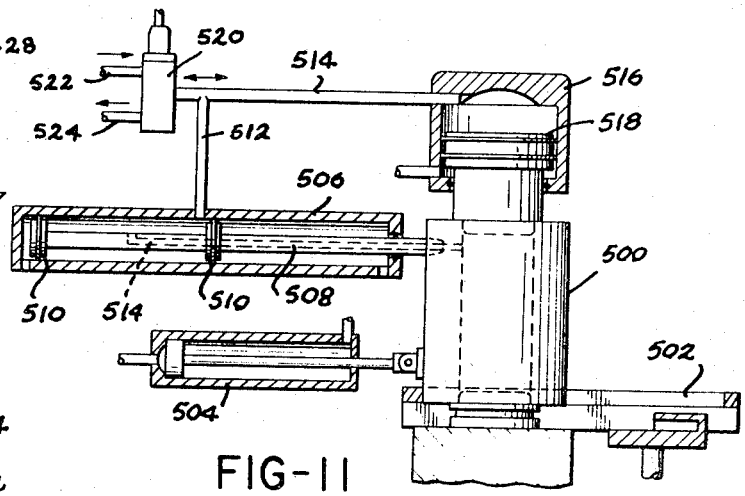
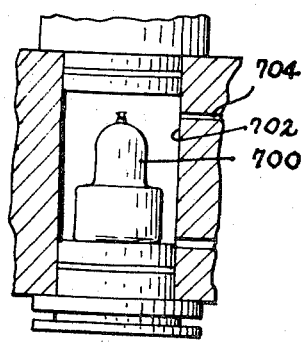
INVENTOR
ALBERT S. ROBERTS
BY
Melvin A. Crosby

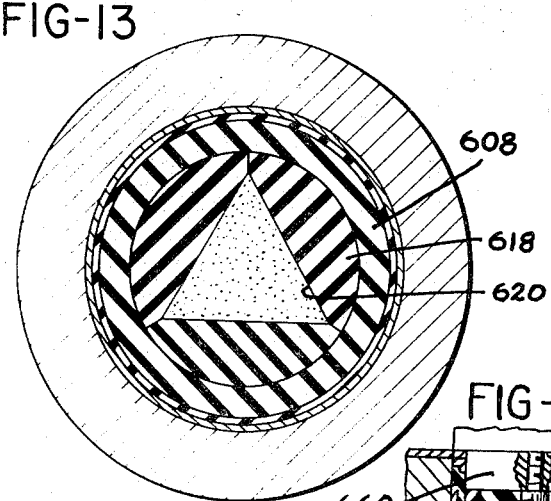
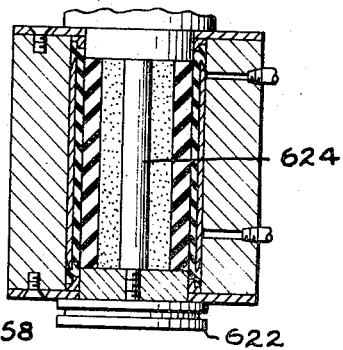
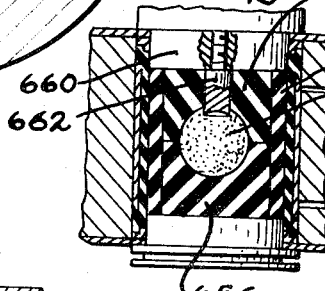
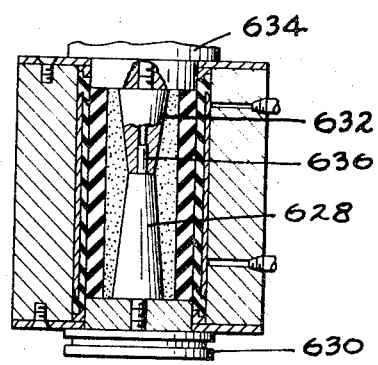
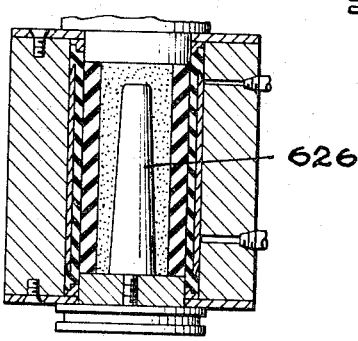
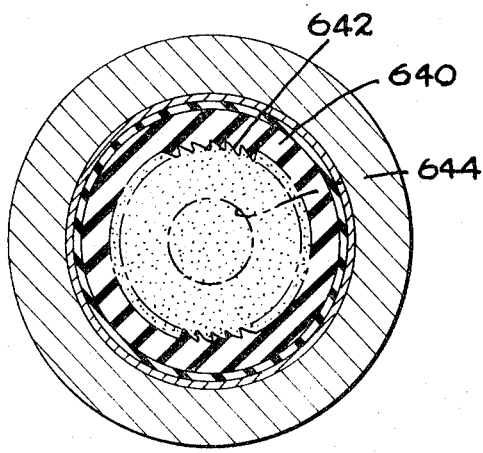
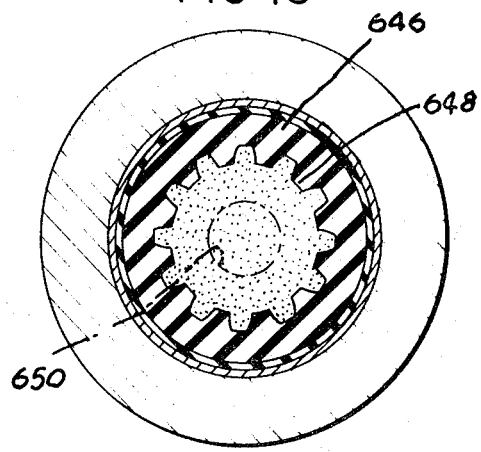

United States Patent Office 3,550,198
Patented Dec. 29, 1970

3,550,198
APPARATUS FOR COMPACTING FINELY-GRANULATED MATERIALS
Albert Samuel Roberts, Rector, Pa., assignor to Kennametal Inc., Latrobe, Pa., a corporation of Pennsylvania
Filed Dec. 22, 1967, Ser. No. 699,983
Int. Cl. B30b 5/02, 11/32; B28b 3/00
U.S. Cl. 18—5                                                    21 Claims

ABSTRACT OF THE DISCLOSURE

Apparatus for compacting finely granulated material in which the material to be compacted is disposed within a rubber-like sleeve and pressure is developed around the sleeve to exert radial pressure on the material for the compacting thereof while simultaneously axial pressure is developed on the material and in which the axial and radial pressures are relieved simultaneously to prevent fracturing of the compacted workpiece.

---

The present invention is concerned with an apparatus for compacting finely granulated materials such as the powders of metals and alloys thereof and of ceramic or cermet materials. More particularly still, the present invention relates to such an apparatus wherein the compaction is accomplished isostatically.

The compacting of finely granulated or powdered materials is, of course, well known. Such materials are compacted for forming work members from materials which are extremely difficult to process in any other manner. For example, metal carbides and ceramic materials are advantageously processed in the powder form and compacted to as near the final shape of a desired work member as possible and then are fired or sintered to form the compacted material into a solid coherent body whereupon any machining that is necessary is then carried out.

In other instances it is a matter of convenience and economy to form work members from powdered materials. The more common forms of powder metallurgy fall into this latter classification and it is possible, through the compacting of powdered materials to form gears and the like which, if produced from solid stock, would require a great deal of expensive machining. The same comments apply with respect to ceramic materials which can be processed by a powder material technologies and gain the advantage of either convenience or economy or both.

While the present invention is broadly applicable to the compacting of finely granulated or powdered materials of various types, it will be described in particular in connection of powder materials embodying metallic carbides.

In the compacting of powders having metal carbides therein, the usual procedure is to admix the carbide powder with an auxiliary metal which serves as a binder and filler for the completed article together with a lubricating material which lubricates the particles relative to each other so that they will slide on one another during the compacting operation and also so that the compacted member will be self-supporting to permit further treatment thereof. Such further treatment may, for example, include a presintering operation in which the compact is made sufficiently coherent to permit handling and machinging thereof and, thereafter, the shaped compact is finally fired or sintered and takes on its final permanent characteristics and, after which, further machining can be carried out if necessary. During the presintering operation considerable if not all of the lubricating composition is driven off from the compact and an initial partial welding together of the particles of the compact occur.

In the usual compacting procedure wherein the powders are pressed in a die cavity between opposed plungers, the compact, prior to presintering, is extremely fragile and must be handled with great care. Further, the binding together of the particles in the compact by the lubricating agent is quite weak and any substantial forces exerted on the compact before presintering can cause it to rupture or develop cracks or voids therein. The apparatus of the present invention produces strong compacts which are easier to handle without breakage.

As mentioned, in the usual manner of compacting, the powdered material is placed in a die cavity and is compacted between opposed die members or plungers, either one or both of which are movable. With relatively short compacts, this type of compaction is generally satisfactory but whenever the compact becomes very long in the pressing direction with respect to the lateral dimensions thereof, or whenever the section of the compact varies considerably, the compact is likely to be defective because all portions thereof are not subjected to the same high pressure that is exerted on the ends of pressing plungers. Relatively long compacts, or compacts of non-uniform section, therefore, tend to be less dense in the center and can shrink excessively in the central portion upon sintering.

The apparatus of the present invention is adapted for the compacting of powdered materials in the form of relatively long compacts, and compacts of complex shape, while, at the same time, the density throughout the compact is substantially uniform. This is accomplished, in brief, by subjecting the entire exposed surface of the compact, or at least the exposed outer surface thereof, to the same pressure. Such pressing is referred to as isostatic pressing because the pressure is everywhere the same. To accomplish the isostatic pressing of a relatively long compact, or a compact of complex shape, requires that the compact be subjected to both radial and axial pressure simultaneously. Still further, the pressure is preferably developed at a substantially equal rate in both the radial and axial directions to minimize movement of the powdered materials being compacted. More important still, however, it is essential when decompressing the compact to remove the radial and axial pressures from the compact at the same rate so that the compacted powders do not shift relative to each other. The compacts exhibit a certain degree of spring-back upon decompression and any shifting of one part of the compact relative to another during decompression will produce fractures or cracks or voids in the compact which will result in a faulty workpiece when the compact is finally sintered.

The present invention is particularly concerned with an apparatus for carrying out isostatic pressing of finely granulated materials as discussed above.

Another object of this invention is the provision of an apparatus for the isostatic pressing of finely granulated materials.

A still further object of this invention is the provision of an apparatus for forming superior compacts from finely granulated materials.

A particular object of this invention is the provision of an apparatus by means of which long compacts of granulated materials can be successfully formed and which compacts will have substantially uniform density throughout.

Another particular object of the present invention is the provision of an apparatus for producing long compacts of finely granulated materials in which a minimum of faulty compacts are produced.

It is a further object of the present invention to provide an apparatus for forming complex shapes from powdered materials.

Another object of the present invention is the provision of an apparatus for forming compacts from powdered materials in which the compacts will have greater strength than has heretofore been possible to achieve with conventional compacting.

A still further object is the provision of an apparatus in the nature referred to which is convenient and rapid to use and which can be incorporated in production facilities.

Still another object is the provision of an apparatus of the nature referred to in which the apparatus is relatively simple and inexpensive to construct and can be easily serviced.

The several objects referred to above as well as still other objects and advantages of the present invention will become more apparent upon reference to the following detailed specification taken in connection with the accompanying drawings, in which:

FIG. 3 is a vertical sectional view as indicated by line III—III on FIG. 2;

FIG. 5 is a vertical sectional view of the cell and closure member drawn at enlarged scale;

FIG. 6 is a view, partly in section, showing a metal sleeve which is disposed inside the cell;

FIG. 7 is a sectional view, drawn at greatly enlarged scale, showing a portion of the sleeve of FIG. 6;

FIG. 8 is a schematic representation of one form which the hydraulic and pneumatic control circuit for the apparatus can take;

FIG. 10 shows a modification of the apparatus;

FIG. 11 shows another modification of the apparatus; and

FIGS. 12–20 show typical die arrangements.

Figure 1:
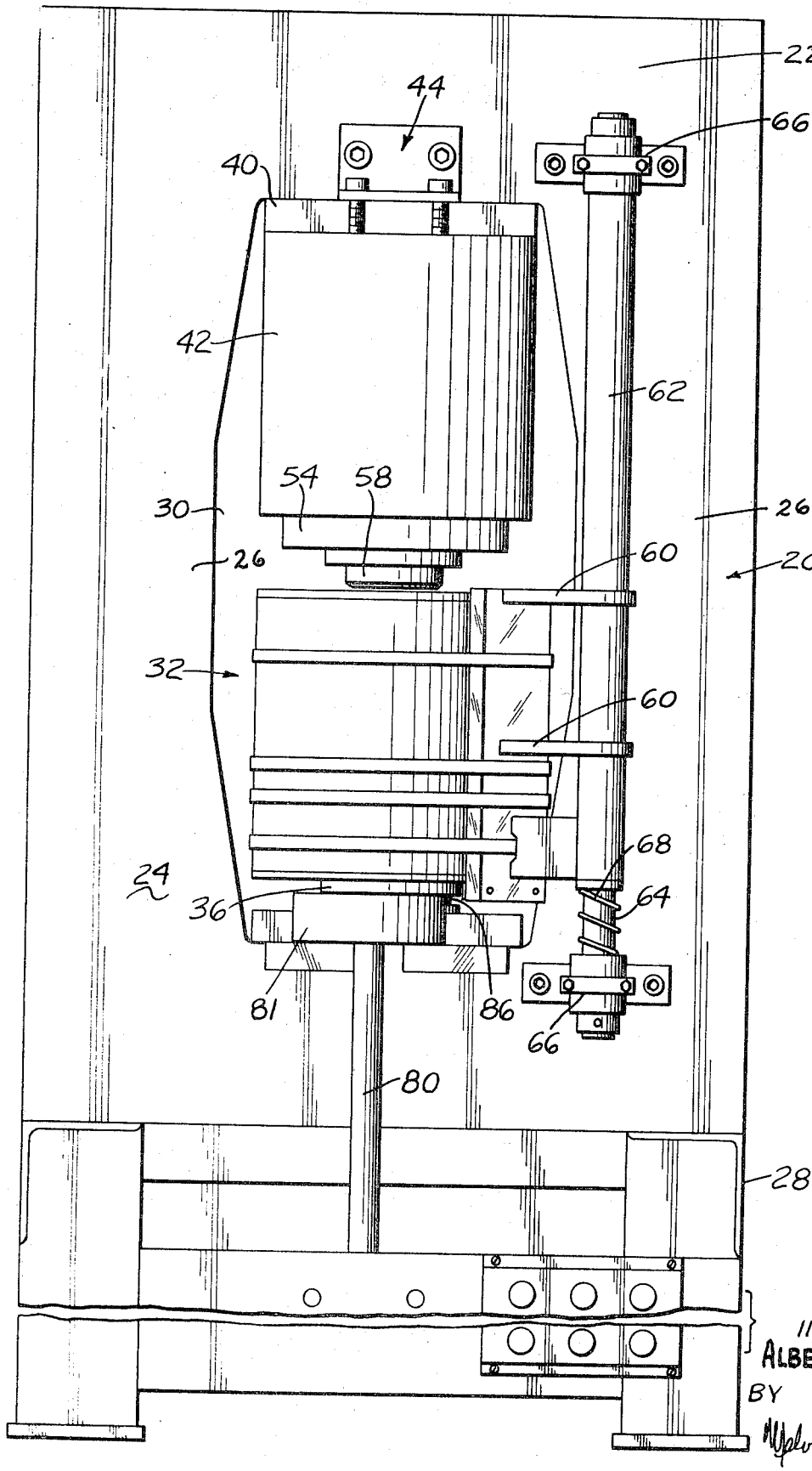
FIG. 1 is a front elevation of a preferred form which the apparatus according to the present invention can take.
Figure 2:
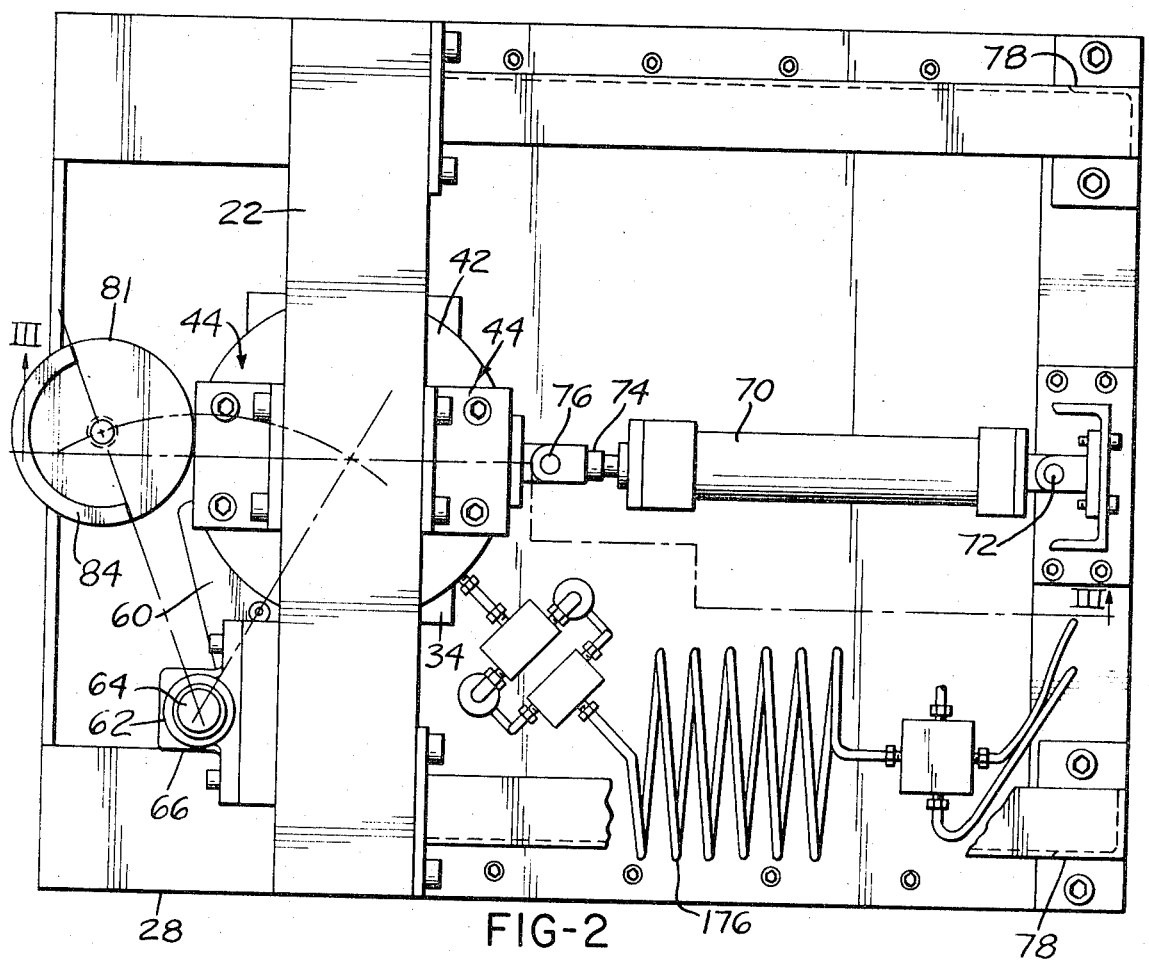
FIG. 2 is a plan view of the apparatus.

Referring to the drawings somewhat more in detail, FIG. 1 shows the apparatus according to the present invention in front elevation and FIG. 2 is a plan view thereof. The apparatus comprises a frame 20 which may be of any suitable design to withstand the thrusts developed within the apparatus. In general, frame 20 comprises head portion 22, base portion 24, and side portions 26 connecting the said head and bed portions. The frame may be in the form of an integral casting or may be made up as a weldment, or may be cut from a plate, or it may be made in any other manner known in the press art.

Frame 20 may rest on a base portion 28 which forms a convenient space for receiving hydraulic and pneumatic auxiliaries and control elements for the apparatus. Base portion 28 may consist of structural members such as angles or the like welded or riveted together and braced for the purpose of supporting the weight of the apparatus mounted thereon.

FIGS. 1, 2 and 3 will show that there is mounted within the opening 30 of the frame of the press frame, a cell or cylindrical member generally indicated at 32 and within which cell is a cavity 38 in which the compact to be made is compacted. Below cell 32 is an anvil member 34 secured to bed portion 24 of the frame of the apparatus. Resting on anvil 34 is a lower die or closure member 36 which extends into cavity 38 of cell 32. Die member 36 forms the lower closure member for cavity 38 and may, as will be seen hereinafter, have a core member affixed thereto and extending upwardly into the cavity, if so desired.

Mounted on the under side of head 22 of the frame of the press is a second anvil member 40 and abutting anvil member 40 from the under side is a thick walled cylinder 42. Cylinder 42 is held against anvil member 40 and is supported on head 22 of the press frame by the brackets and bolts generally indicated at 44.

The lower end of the thick walled cylinder 42 terminates above the upper end of cell 30 and reciprocably mounted in the lower end of cylinder 42 is a piston 46. Piston 46 has secured to the lower end thereof a member 48 which projects out the lower end of the cylinder through a bushing 50 which carries a seal ring 52 and which is retained in ring 54 secured to the lower end of the cylinder. Surrounding member may be a compression spring 56 which biases the piston assembly upwardly in cylinder 42. As will be seen hereinafter, spring 56 can be replaced by a supply of compressed air to the underside of piston 46.

Secured to the lower end of member 48 is an upper die or closure member 58 which forms the upper closure for cavity 38 in cell 32 and also forms the member which develops axial pressure on the material within cavity 38.

As will be seen in FIGS. 1 and 2, cell 32 is provided with laterally extending arms 60 which are fixed to a sleeve 62 vertically reciprocable on a post 64 secured to the press frame by brackets 66.

A compression spring 68 is disposed between the lower end of tube 62 and the lower one of brackets 66 and supports the weight of the cell 32 and the parts connected thereto. A ram 74 pivotally connected to cell 32 at 76 is reciprocable in a cylinder 70 which, in turn, is pivotally connected to base 28 at 72.

Spaced from the axis of cell 32 is an unloading member 81 which receives lower die member 36 when cell 32 is pushed outwardly from the press frame by ram 74. Ram 74 may bottom in its cylinder 70 to locate cell 32 in its inner position, in which it is illustrated in FIG. 3, or in its outer position where it is coaxially arranged with member 81. Other stop means could, of course, be provided to limit the movement of cell 32.

Unloading member 81 is supported on a ram 80 which extends into cylinder 82 mounted in base 28. When member 81 is in its uppermost position it is substantially coplanar with lower anvil member 34 so that lower die member 36 will slide directly from the anvil member to member 81. Member 81 is provided with an arcuate lip 84 engageable in a groove 86 provided in the die member 36 to lock member 81 and die member 36 together when cell 32 is in its outer position.

Figure 4:
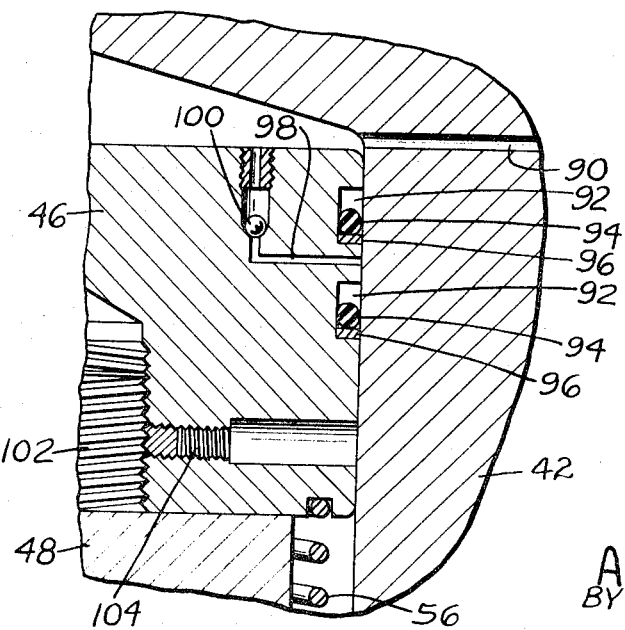
FIG. 4 is a fragmentary sectional view of the cylinder and ram for the upper closure member drawn at enlarged scale.

Returning to piston 46, an enlarged framentary view thereof is shown in FIG. 4. In FIG. 4, it will be observed that a passage 90 is provided in cylinder 42 leading into the space above the piston 46. Piston 46 has grooves 92 rings 96 on their lower sides. A passage 98 leads from therein and in these grooves are disposed the resilient rubber-like O rings 94 which are provided with backup the space between the sealing rings back to the top of the piston via a check valve 100 opening toward the top of the piston. The provision of this passage permits leakage fluid to be drained off between the rings following each pressure cycle so that the rings are in the best possible condition for establishing a seal between the piston and the cylinder.

FIG. 4 will also show that member 48 has a threaded shank 102 that engages a threaded bore in piston 46 and which is locked in place by the lock screw 140. Similarly (FIG. 3), upper die member or closure member 58 has a threaded shank 106 that is threaded into the member 48.

Turning now to FIG. 5, there is shown, at enlarged scale, the cell which has been generally referred to with the reference number 32. In FIG. 5, it will be seen that the intermediate portion of the cell comprises a heavy walled cylindrical member 110 having a bore 112 extending axially therethrough and open at both ends. Member 110 and cylinder 42 (FIGS. 1, 3) also are heavy high grade forging, so as to be able to withstand the extremely high pressures employed in the practice of the present invention.

Fitted closely within the bore 112 of member 110 is a relatively thin tubular element 114. Tubular element 114, as will be seen hereinafter, has passage means extending longitudinally thereof on the outside and is provided with radial holes 116 so that pressure fluid introduced into bore 112 via passage 92 will be distributed within the bore over the entire outer and inner surfaces of sleeve 114.

The extreme ends of sleeve 114 incline inwardly on their outer surfaces away from bore 112 so as to receive the tip portions 118 on the ends of a flexible rubber-like bag 120 disposed inside sleeve 114. The space inside bag 120 is the cavity 38 of the cell. Rings 122 are disposed in bore 112 at the opposite ends of bag 120 and engage the opposite ends of the bag and are, in turn, retained in place by plates 124 on the ends of member 110 and held in place by screws 126. Rings 122 and plates 124 may be made in one piece. At this point it will be apparent that pressure fluid introduced into bore 112 via passage 92 will be distributed over the entire periphery of bag 120 and will press the bag inwardly toward the axis of bore 112. Material placed within the cavity 38, such as powdered material, will thus be compacted and the compacting pressure exerted on the material via the bag 120 will be uniform throughout the length of the cavity 38.

Inasmuch as granular or powdered material within the cavity will also tend to flow axially when subjected to radial pressure, it is important for the ends of the cavity to be closed and this is taken care of by lower die or closure member 36 and upper die or closure member 58. At this point it will be noted that the diameter of piston 46 (FIG. 3) is such that, if the same pressure is supplied to the upper side thereof as is supplied to the outside of bag 120, there will be more downward thrust developed on piston 46 by the fluid pressure than will be developed upwardly on the piston by the thrust of the material in the cavity of the cell, against the lower face of closure member 58. Thus, when closure member 58 is pushed down to its closing position by the same fluid supplied to the cell, no amount of pressure supplied to the outside of bag 120 can cause the upper closure member to move.

With reference to metal sleeve 114, this is shown at somewhat enlarged scale in FIG. 6 where it will be seen to comprise a sleeve having a plurality of holes distributed thereover in vertical and horizontal rows. It has been found satisfactory to provide a vertical row of holes about every twenty-two and one-half degrees with the holes spaced apart about one-half inch in the axial direction. The holes may be about ⅛ inch in diameter except for the final horizontal rows of holes adjacent to the ends of the sleeve and which are advantageously about ¹⁄₁₆ inch in diameter. With a vertical row of holes for every 22½ degrees of the periphery of the sleeve, sixteen vertical rows of holes result. It is advantageous to provide notches 130 in the ends of the sleeve so that the final horizontal rows of holes have free access to the supply of fluid admitted into bore 112 and also so that pressure fluid will extend completely to the end of bag 120.

FIG. 7 shows a fragment of the sleeve at enlarged scale with a portion of the bag 120 mounted thereon. The small holes at the end of the sleeve are identified by reference numeral 132 and the larger holes in the sleeve by the reference numeral 134. To provide for free flow of fluid around sleeve 114, it is provided near its ends with the arcuate raised portions 136 (FIG. 6) of which there may be four adjacent each end of the sleeve and and others between the ends if so desired. These arcuate portions are circumferentially spaced from each other to leave passages 138 for the free flow of fluid past the raised portions 136. In this manner sleeve 114 can be fitted relatively closely into bore 112 while not interfering with the supply of fluid to the entire outer surface of bag 120 or the release of fluid from bore 112. The tapered ends of sleeve 114 press lip portion 118 of bag 120 against the bore 112 and, in this manner, insure a tight seal at the ends of the bag.

FIG. 8 illustrates schematically the hydraulic circuit employed in the practice of the present invention. In FIG. 8, reference numeral 150 indicates a fluid reservoir which is connected by a conduit 152 with high pressure pumping means 154. The discharge side of high pressure pumping means 154 is connected to conduit 156. A pressure indicating gage 158 is also connected to conduit 156. A safety valve 160, which may be in the form of a rupture disc, is connected between conduit 156 and drain conduit 162 leading back to reservoir 150.

Also connected to conduit 156 is a pressure switch 164 which closes at a predetermined pressure in conduit 156. A further conduit 166 branches off from conduit 156 and a normally open pressure releasing valve 168 is connected between conduit 166 and drain conduit 162.

Conduit 156 leads to one side of a normally open valve 170, the other side of which is connected by conduit 172 with passage 90 in cylinder 42 in which piston or ram 46 is reciprocally mounted. Valve 170 is bypassed by an adjustable needle valve 174.

The aforementioned conduit 166 leads to a flexible choke coil 176 by means of which it is connected with passage 92 in cylinder 110. The flexible choke 176 permits movement of cell 32, and which comprises member 110, to its inner and outer positions as previously described, and also provides control of the rate of release of pressure from around bag 120 in member 110 as will be described more fully hereinafter. At this point it might be noted that the pressures employed in the hydraulic circuit are on the range of 35,000 pounds per square inch and upwardly and that the conduits employed are extremely heavy. The choke coil 176, for example, is made up of pipe which has an outside diameter of ¼ inch and a passage therethrough of .083 inch.

Member 110 has a second somewhat larger passage 93 leading therefrom to one side of a normally open valve 178 which is mounted so as to move with member 110. The discharge side of valve 178 is connected with reservoir 150 by way of a flexible drain line 180. The aforementioned valves 168, 170 and 178 are movable from their normal open positions to closed position by a supply of air under pressure to pilot operators therefor. In FIG. 8, 182 represents a source of compressed air from which leads a pressure supply manifold 184. Manifold 184 leads to a normally closed valve 186 which is operable into open position by energization of a solenoid S2 to energize high pressure pumping means 154. Manifold 184 also leads a normally open valve 188 operable into closed position by energization of a solenoid S3. When valve 188 is opened normally, open valve 168 is closed, and when valve 188 is closed, valve 168 is open.

Manifold 184 leads to still another valve 190 operable into open position by energization of a solenoid S8 and when open causing normally open valve 170 to close. Manifold 184 also leads to a normally closed valve 192 which, when operated into open position by energization of solenoid S9 supplies air under pressure to the underside of piston or ram 46 to urge it upwardly in its cylinder. The valve 192 and its solenoid are preferred to spring 56.

A further valve 194 is operable into closed position by energization of solenoid S7. Valve 194 is adapted, when closed, to permit opening of normally open valve 178, while opening of valve 194 will cause valve 178 to close. The conduit 196 leading from valve 194 to the pilot operator on valve 178 is preferably in the form of a flexible conduit.

The cylinder 70, of ram 74, which moves cell 32 between its two operative positions, has its opposite ends connected with the service ports of a four-way valve 198. The inlet of this valve is connected to manifold 184 and, upon energization of a solenoid S1, valve 198 is shifted so as to cause cell 32 to move into the press frame into alignment with the upper and lower dies or closure members. Energization of solenoid S4, pertaining to valve 198 will produce the opposite effect, and will cause cell to move out of the press frame into alignment with the unloader which comprises the vertically reciprocal member 81.

Cylinder 82 pertaining to unloader member 81 has its opposite ends connected to the service port of still another four-way valve 200 which has its inlet connected to manifold 184. Solenoids S5 and S6 are associated with valve 200 for shifting it in its opposite directions. When solenoid S5 is energized, valve 200 is shifted in a direction to cause unloading member 81 to move downwardly. On the other hand, when solenoid S6 is energized, valve 200 is shifted into position to cause unloading member 81 to move to its uppermost position. The end positions of members 81 can be determined by bottoming of the ram in cylinder 82 or by other stop means.

FIG. 8 also shows, schematically, the various limit switches which are operated by the movable parts of the apparatus. Limit switch LS1 is actuated by cell 32 in its innermost position whereas limit switch LS2 is actuated by the cell when it is in its outermost position. Limit switch LS4 is actuated by unloading member 81 when the latter is in its uppermost position and limit switch LS3 is actuated by the unloading member 81 when the latter is in its lowermost position. When piston or ram 46 pertaining to the top closure member is in its uppermost position, it actuates limit switch LS5 whereas when it is in its lowermost position it actuates limit switch LS6.

Figure 9:
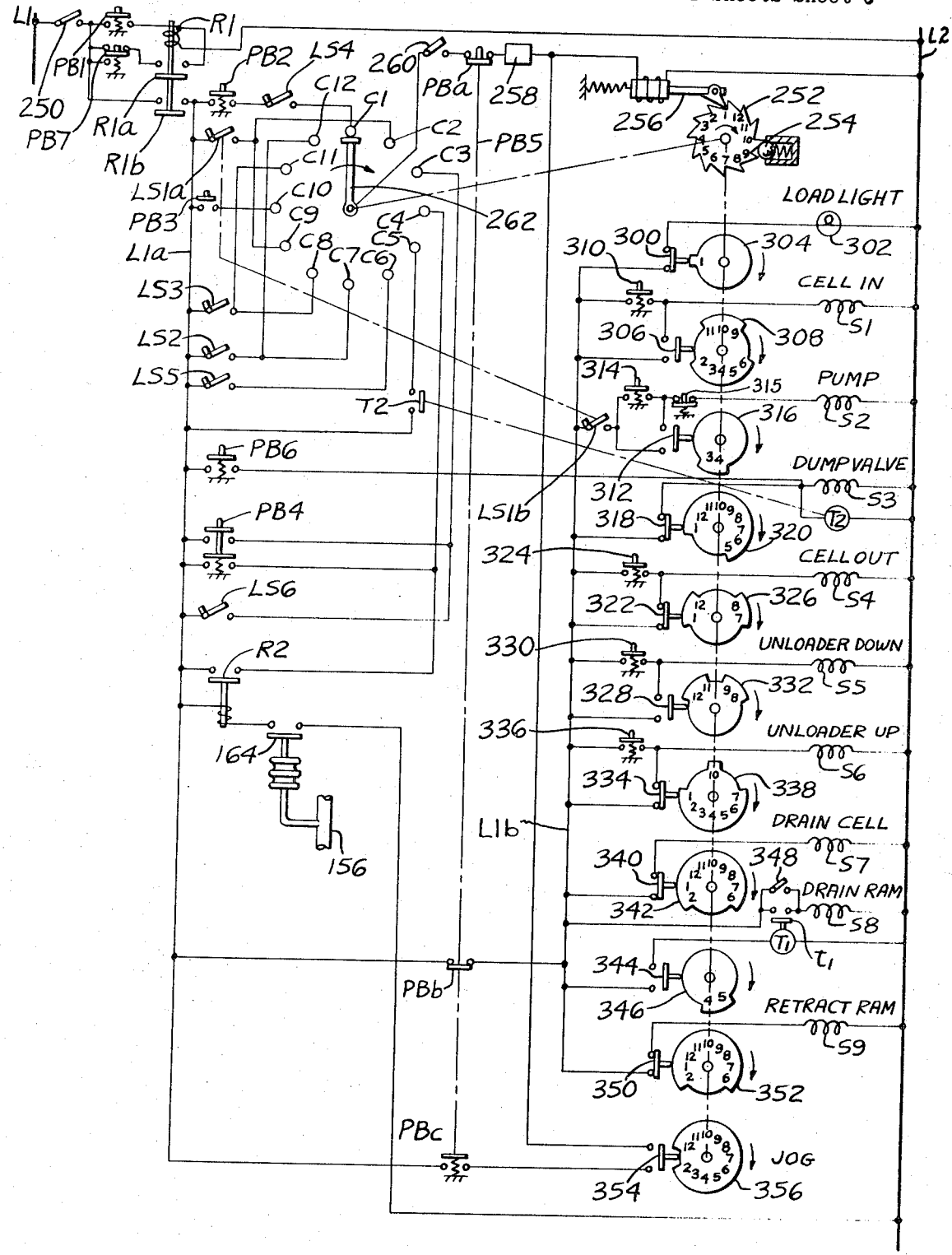
FIG. 9 is a schematic representation of one form which the electrical control circuit for the apparatus can take.

The electric circuit employed in the practice of the present invention is illustrated in FIG. 9. In FIG. 9 the power lines are indicated L1 and L2. A main switch 250 is provided in L1 which is closed to prepare the circuit. Closing of the switch PB1 energizes a relay R1 which establishes a holding circuit through its blade R1a and a normally closed stop switch PB7. A second blade R1b of relay R1 closes to energize line L1a. When line L1a is energized, line L1b is also energized through a normally closed blade PBb of a pushbutton switch PB5.

Connected between line L1b and L2 is a plurality of cycle control switches, to be described hereinafter, which are under the control of respective cams, and which cams are mounted on a common shaft which, in turn, is indexing wheel 252 having 12 positions and being releasably detained and located in each position by a detent means 254 and having a solenoid actuated stepping mechanism 256. Stepping mechanism 256 is connected via an interrupter switch 258 and a normally closed blade PBa of pushbutton PB5 with one side of a selector switch 260, the other side of which is connected with a switch arm 262 which is also connected to be driven by indexing wheel 252 and which switch arm, as it indexes, successively engages a plurality of contacts arranged in a circular path and referenced from C1 to C12. It will be evident that each time the indexing device 256 is energized, wheel 252 will be indexed one step. Switch arm 262 has its contacts C1 to C12 connected with various machine and manually operated control switches so that the successive steps in a cycle of operation of the apparatus are carried out in order.

A cycle is started with switch arm 262 resting on contact C1. When the unloading member 81 is up it closes limit switch LS4 and, if relay R1 is energized, closing of switch PB1 will cause the solenoid of the stepping mechanism 256 to be energized and this will cause wheel 252 to advance one step in the clockwise direction so arm 262 rests on contact C2.

The next advancing step occurs when blade LS1a of limit switch LS1 is closed by the movement of cell 32 to its innermost position. This step moves arm 262 to contact C3. The next indexing step, which moves arm 262 to contact C4, will take place when ram 46 reaches its lowermost position and closes limit switch LS6, or when a pushbutton PB4 is actuated.

The next step, which moves arm 262 from contact C4 to C5 takes place when pushbutton PB4 is again depressed or when relay R2 closes due to the closing of pressure switch 164.

Indexing of arm 262 from contact C5 to C6 will occur when the blade t2 of a timer T2 closes.

Indexing of arm 262 from contact C6 to contact C7 will take place when limit switch LS5 is closed by the ram 46 reaching its uppermost position.

The next indexing step, which moves arm 262 from contact C7 to contact C8, will occur when limit switch LS2 is closed indicating that the cell has moved to its outermost position.

Indexing of arm 262 from contact C8 to C9 will occur when limit switch LS3 closes, indicating that the unloader member 81 has moved to its lowermost position.

The indexing of switch arm 262 from contact C9 to contact C10 will take place when blade LS1a of limit switch LS1 again closes indicating that the cell 32 has returned to its innermost position. When switch arm 262 has reached contact C10 it dwells thereon until pushbutton PB3 is closed.

When pushbutton PB3 is closed, switch arm 262 will index to contact C11 and will remain there until limit switch LS3, showing that the unloader member 81 has reached its lowermost position, is again closed, whereupon switch arm 262 will index to contact C12 and will rest thereon until limit switch LS2 is closed, indicating that the cell 32 has reached its outermost position, whereupon closing of limit switch LS2 will cause switch arm 262 to index back to its starting position in engagement with contact C1.

As mentioned before, when the unloading member 81 reaches its uppermost position, it will engage and close limit switch LS4 but no further indexing of wheel 252 or switch arm 262 will take place until pushbutton PB2 is again manually depressed.

Fixed to indexing wheel 252 so as to rotate therewith are the aforementioned cams which actuate the cycle control switches which are disposed between lines L1b and L2. All of the said switches are normally open and are moved into closed position by their respective cams. For convenience, it is considered that the cams and switch arm 262 are in their basic position in FIG. 9 and that the indexing wheel 252 and, therefore, the cams and switch arms take twelve (12) steps in making one complete revolution.

The first switch 300 is in series with a lamp 302 and is held closed by its cam 304 only when switch arm 262 is in contact with contact C1. When light 302 is illuminated, it shows that the cell is ready to be loaded preparatory to commencing a cycle of operations.

The next switch 306 is in series with solenoid S1, energization of which will cause cell 32 to move inwardly into working position in the press frame. Cam 308 holds switch 306 in closed position during steps 2 through 6 and 9 through 11 of indexing wheel 252. A normally open pushbutton 310 for manual control of S1 is connected in bypassing relation to switch 306.

The next switch 312 is connected in series with solenoid S2, energization of which will activate the high pressure pumping means 154. Switch 312 is bypassed by a normally open pushbutton switch 314 and is in series with a normally closed pushbutton switch 315. Also in series with solenoid S2 is a normally open blade LS1b of limit switch LS1. This blade is closed only when the cell 32 is in its working position so that it is not possible to operate the high pressure pumping means except when cell 32 is in the press in working position. Cam 316 holds switch 312 closed in steps 3 and 4.

The next switch 318 is in series with solenoid S3 pertaining to valve 188 which controls the pressure release or dumping valve 168. Switch 318 is held in its closed position by its cam 320 while indexing wheel 252 is in position 1 and in positions 5 through 12. Connected in parallel with solenoid S3 is timer T2 which controls the aforementioned blade t2. A pushbutton PB6 is provided connected between line L1a and the side of solenoid S3 opposite line L2 so that switch PB6 can be closed at any time to energize solenoid S3 thereby to dump the pressure in the high pressure circuit back to the reservoir.

The next switch 322 is in series with solenoid S4 which controls the movement of the cell 32 outwardly and is bypassed by a normally open pushbutton 324. Cam 326 pertaining to switch 322 holds the said switch closed while indexing wheel 253 is in positions 1, 7, 8 and 12.

The next switch 328 is in series with solenoid S5 which causes downward movement of the unloader and is bypassed by a normally open pushbutton 330. Cam 332, pertaining to switch 328, holds the said switch closed while indexing wheel 252 is in positions 7, 9, 11 and 12.

The next switch 334 is in series with solenoid S6 which controls upward movement of the unloaded. Switch 334 is bypassed by a normally open pushbutton 336. Cam 338, pertaining to switch 334, holds it closed while indexing wheel 252 is in positions 1 through 7 and 10.

The switch 340, which is in series with solenoid S7 that effects rapid draining of pressure fluid from inside cell 32, is held closed by its cam 342 while indexing wheel 252 is in positions 1, 2, and 6 through 12.

Switch 344 is in series with timer T1 and is moved to its closed position by cam 346 when indexing wheel 252 is in positions 4 and 5. The timer T1 controls a blade *t*1 which is in series with solenoid S8 which is effective for causing rapid exhaust of pressure fluid from above ram 46. Blade *t*1 is bypassed by a selector switch 348 which can be closed to energize solenoid S8.

Switch 350 is in series with solenoid S9 which controls the supply of air to cylinder 42 for retracting ram 46. Switch 350 is held in its closed position by its cam 352 while indexing wheel 252 is in positions 1, 2, and 6 through 12. S9 and the parts pertaining thereto can be eliminated by providing a fairly strong spring 56 in cylinder 42 for causing ram 46 to retract.

A final switch 354 is provided which is held closed by its cam 356 in every position of indexing wheel 252 except position 1 thereof. Switch 354 is connected on one side with the solenoid of the indexing mechanism and on the other side is connected through a normally open blade PBc of pushbutton PB5 with line L1a. Whenever switch 354 is closed, closing of blade PBc will be accompanied by an indexing movement of the indexing wheel 252. As will be seen, actuation of pushbutton PB5 will also open blade PBb thereof thereby to de-energize line L1b. Still further, actuation of switch PB5 will open its blade PBa and thus interrupt the circuit from rotating switch 262 to the solenoid of the indexing mechanism 256.

The present invention, as will be perceived, may be practiced by placing the material inside the rubber-like bag in the cell 32 in which case the largest diameter cylindrical piece could be formed; or a tubular rubber-like liner member can be placed inside the bag and the diameter of the workpiece produced thereby reduced. Still further, multiple die parts of rubber-like material or a combination of rubber-like material and metal could be placed within the bag or within the tubular rubber-like liner disposed inside the bag for compacting material. Each size cell thus has a considerable range of workpiece sizes that can be made therein.

An operative cycle of the apparatus can be described briefly as follows, reference being had to FIGS. 8 and 9. Commencing with the indexing wheel 252 and the parts connected thereto in position 1, the load light 302 will be illuminated, cell 32 will be in its outer position, the unloader 81 will be up and ram 46 will also be in its upper position. The cell can now be charged with material and switch PB2 is then closed. This will index the indexing mechanism to position 2 and in this position the load light will be extinguished, the cell will move into working position in the press, the dump valve 168 will close, and the jog switch will be made effective by closing of switch 354.

When the cell reaches its innermost position and closes LS1, the indexing mechanism moves to position 3 and pump 154 will start and the retracting mechanism for ram 46; when this mechanism is fluid operated; will be released to permit the ram to move downwardly.

When the ram reaches its lower position and actuates limit switch LS6, the indexing mechanism moves to position 4 and timer T1 is started. When pressure develops above ram 46 and in cell 32 around the rubber bag to the desired level, switch 164 will close and close relay R2 and the indexing mechanism will move to position 5.

In position 5, pump 154 is turned off and valve 168 is opened to drain the system. The pressure drop above ram 46 and in cell 32 around the rubber bag is, however, gradual because of needle valve 174 and the choke coil 176. In position 5, timer T2 is also started and after a predetermined time, its blade closes and the indexing mechanism moves to position 6.

In position 6, valve 178 opens to drain cell 32 quickly while valve 170 also opens, due to a blade of timer T1, to drain the space above piston 46. Furthermore, the supply of retraction fluid to piston 46 is initiated so that the ram moves upwardly.

When the ram reaches its uppermost position and actuates switch LS5 the indexing mechanism moves to position 7 and cell 32 moves outwardly. When the cell reaches its outermost position and actuates switch LS2 the indexing mechanism moves to position 8. In this position the unloader 81 moves downwardly, carrying with it lower closure member 36 and the compacted workpiece resting thereon with or without parts of the die in which the workpiece was formed.

When the unloader reaches its lower position, it actuates switch LS3 and the indexing mechanism moves to position 9 and in this position cell 32 will move inwardly. When the cell is completely in and actuates switch LS1, the indexing mechanism moves to position 10 and the unloader moves upwardly. This upward movement of the unloader elevates the workpiece to a proper height to be removed from the unloader in a convenient manner.

Further movement of the indexing mechanism is then brought about by closing of manual switch PB3 which will move the indexing mechanism to position 11. In position 11, the unloader moves downwardly and again actuates switch LS3. When switch LS3 is actuated the indexing mechanism will move to position 12 and, in this position of the mechanism, cell 32 will again move to its outer position.

When cell 32 reaches its outer position and actuates switch LS2, the indexing mechanism is again indexed back to position 1 and this will cause upward movement of the unloader to its uppermost position and will cause the load light again to become illuminated to show that the cell is ready to receive a charge of material and for a new cycle to be initiated.

The jogging switch represented by blades PBa, PBb and PBc provides means for selectively indexing the indexing mechanism independently of the machine cycle for test purposes and the like.

Switch PB6 permits operation of the dump valve to remove pressure from the system at any time. Switch PB4 can be availed of to index the mechanism out of positions 3 and 4, thus preventing the pump from building up pressure. Still further, switch 348 can be used to drain the space above ram 46 at any time.

The foregoing particular cycle of operations is not the only one that can be followed in the practice of the present invention but it has proved to have merit in connection with the operation of the apparatus in FIGS. 1 to 9.

FIG. 10 shows a modified arrangement of the apparatus in which a relatively long stroke press arrangement is provided with the motor of the press providing the entire power for carrying out the cycle. In FIG. 10 a press ram 400 is reciprocally mounted in a press cylinder 402. Actuating fluid is supplied to one or the other end of cylinder 402 from a four-way valve 404 which derives pressure fluid from a pump 406. Energization of solenoid S20 will cause press ram 400 to move downwardly whereas energization of solenoid S22 will cause the press ram to move upwardly. Closing of start switch 408 will cause energization of a relay R3 which has a holding circuit through a normally closed pressure operated switch 410 and a normally closed stop switch 412. When relay R3 is energized, its blade R3a completes a circuit through solenoid S20 to cause the press to move downwardly. When relay R3 is de-energized by opening a pressure switch 410 or manual switch 412, blade R3a completes a circuit through solenoid S22 and a position operated switch 414 and the press ram will move upwardly until cam 416 connected to the ram opens switch 414.

Guided beneath ram 406, as by rods 418, is a cell 420 corresponding to the pressure cell 32 described in connection with the first modification. The press ram, at its lower end, carries the upper closure member 422 for the said cell. The lower closure member 424 for the cell is spaced from the cell on the underside thereof when the press is in open position with the said spacing being sufficient to permit workpieces to be removed from the lower closure member. The lower closure member 424 is mounted on a ram structure 426 reciprocal in a cylinder 428 while cylinders 430 normally support ram 426 in an uppermost position. A source of air pressure at 432 supplies air cylinders 430 while a relief valve 434 permits displacement of air from the cylinders when the press closes.

The alignment of cell 420 with lower closure member is affected by motors 436. Motors 436 are reversibly controlled by a valve 437. In one position of valve 437, cell 420 is moved upwardly from lower closure member 424 to expose a compacted workpiece. In the other position of valve 437, cell 420 is pulled down on lower closure member 424 so the cell can be charged.

Beneath ram 426 in cylinder 428 there is entrapped a body of fluid and this is the fluid which is employed for supplying pressure to cell 420 for a compacting operation. For supplying the fluid to the cell, there is a passage 438 extending axially along ram 426 from its lower end and connected at its upper end to a pipe 440 pivotally connected at one end to ram 426 and pivotally connected at its other end to a second pipe 442 which, in turn, has its other end pivotally connected to cell 420. The aforementioned pivotal connections are fluid joints so that fluid can pass through passage 438, pipe 440 and pipe 442 into cell 420 and develop compacting pressure therein. The pipes 440 and 442 are long enough to permit cell 420 to be separated from lower enclosure member 424 a sufficient distance to remove workpieces that have been compacted in the cell.

The pressure switch 410 is arranged to be actuated by pressure developed in cell 420 by being connected to the fluid space in the cell by conduit 444.

In operation, valve 437 is operated to cause cell 420 to close on lower closure member 424. The charge of powder is placed in the cell, and the press is then caused to close by depressing switch 408. As the press advances downwardly, first upper closure member 442 will close the upper end of cell 420 and thereafter ram 420 and ram 426 will move downwardly as a unit. Downward movement of ram 426 will cause fluid to be displaced from cylinder 428 into cell 420 and develop compacing pressure therein. When this compacting pressure reaches a predetermined level, pressure switch 410 will be opened and the press will reverse and go back to the position in which it is illustrated in FIG. 10. During opening of the press, the air cylinders 430 bias ram 426 in the upward direction and this will create an under pressure in cylinder 428 and effect the quick withdrawal of fluid from cell 420. When the press is completely open, valve 437 is adjusted to lift cell 420 from lower closure member 424 and the compacted workpiece resting on closure member 424 can now be removed.

FIG. 11 shows a modification similar to the one first described except that cell 500 shown in FIG. 11 is reciprocally mounted as on tracks 502. A fluid motor 504 is provided for reciprocating cell 500 on tracks 502 between the inner and outer positions of the cell. Inasmuch as cell 500 moves in a straight line, it becomes possible to supply pressure fluid thereto by a slip joint which may consist of a stationary cylinder 506 and a piston member 508 which is connected to the cell to move therewith. Piston member 508 has spaced spool portion 510 and pressure fluid is supplied to cylinder 506 by a conduit 512 which opens into the cylinder at a point which is always between the spool portions 510 in all positions of cell 500. A passage 514 in piston member 508 communicates the space between spool portions 510 with cell 500. The illustrated arrangement keeps the piston portion and cylinder balanced against end thrusts at all times even when the fluid pressure supplied is extremely high. Conduit 512 is connected with conduit 514 leading to cylinder 516 in which piston 518 for the upper closure member of cell 500 is mounted. A control valve 520 selectively connects conduits 512 and 514 with a pressure conduit 522 or an exhaust conduit 524. It will be appreciated that the pressure in cylinder 516 is always the same as the pressure in cell 500.

Some typical die arrangements are illustrated in FIGS. 12 through 20. In FIG. 12, the cell comprises the outer thick walled forged member 600, the perforated metal liner 602, the rubber-like bag 604 inside metal sleeve 602, and a tubular rubber-like filler member 608 inside bag 604. Inside tubular member 608 are rubber-like segments 610 defining a substantially square cavity. Plate 612 may divide the cavity into two parts so that when powdered material is charged into the two cavities 614 and 616 and thereafter compacted, two plate-like compacts will be formed and each thereof will have a smooth side on the side adjacent die plate 612.

In FIG. 13 three segments 618 are shown inside tubular member 608 and threse define a triangular cavity 602 in which a triangular workpiece can be made.

In FIG. 14 lower closure member 622 has a mandrel 624 connected thereto and extending upwardly on the axis of the cavity. This arrangement permits tubular workpieces to be made. The mandrel 624 can have any desired diameter so the workpiece can be either thick walled or thin walled. Further, mandrel 624 can extend completely to the top of the cavity and could even telescope the upper closure member or it could terminate short of the upper end of the cavity in which case the workpiece produced would have a blind hole therein. In FIG. 15 mandrel 626 is tapered so that the resulting workpiece has a tapered hole therein. In FIG. 16 a lower mandrel 628 is fixed to the lower closure member 630 and an upper mandrel 632 is fixed to the upper closure member 634. These mandrels may taper inwardly toward each other and pin and socket means 636 can be provided to insure alignment thereof when the apparatus is closed prior to compaction.

FIG. 17 shows how the tubular inner die part 640 could be provided with a saw tooth-like inner surface 642 so as to produce members similar to ratchet wheels or reamers. The produced work member could have a central hole as indicated by the dot-dash line 644 by providing the lower closure member with a mandrel as shown in FIG. 14.

In FIG. 18 inner tubular member 646 has teeth 648 formed thereon so that the compact produced has axial grooves so that it can function as a gear or as a spline. The compact in FIG. 18 could also have a central opening 650 formed by a mandrel on the lower closure member as desired. Either of the members 640, 646 could be segmented.

In FIG. 19, the compact to be formed is in the form of a ball 652. This is accomplished by disposing inside tubular member 654 a lower rubber-like die part 656 having a hemishperical cavity in the top and an upper rubber-like die part 658 having a hemispherical cavity in the bottom registering with the cavity in the lower die part. The upper die part has a central axial opening so the charge of powder can be introduced into the cavity formed by the die parts and the upper closure member 660 carries a plunger 662 which closes the filling opening in the upper die part when the apparatus closes.

The die in FIG. 19 is shown prior to the development of pressure in the cell and for this reason plunger 662 extends into the die cavity. When pressure is built up in the cell and the powdered material is compressed, the lower end of plunger 662 will be substantially aligned with the confining walls of the cavity so that the resulting ball will have no more than a slight blemish thereon at the lower end of plunger 662.

FIG. 20 shows how the appartaus of the present invention can be used for isostatic pressing in the absence of any rubber-like die parts. In FIG. 20 the powdered material to be compacted is contained within a flexible fluid tight bag 700 which is disposed within the cavity 702 of the cell. Pressure is built up in cavity 702 by a supply of fluid through passage 704. The fluid will fill the cavity and bag 700 will be completely submerged therein and isostatic pressing of the material in the bag will result.

What is claimed is:

1. An apparatus for the compacting of granulated substantially dry material comprising; a press frame having a working space, a cylindrical member in said working space having its axis vertical and having an axial cavity open at the top and bottom, upper and lower closure members for closing the opposite ends of said cavity, a bed in said frame supporting said lower closure member at the bottom of the cylindrical member, piston-cylinder means in the frame reciprocally supporting said upper closure member for movement toward and away from the upper end of said cylindrical member, a flexible fluid impervious sleeve lining said cavity and sealed to said cylindrical member at opposite ends of said cavity, said lining defining a compacting space to receive material to be compacted, means for supplying fluid under pressure to said piston-cylinder means to move said upper closure member against the upper end of said cylindrical member to close the upper end of said cavity, means for supplying fluid under pressure to the outer surface of said sleeve to develop compacting force on material in the said compacting space to form a work member in said space, and means for releasing the pressure from said piston-cylinder means and from the outer surface of said sleeve simultaneously.

2. An apparatus according to claim 1 in which the supply of pressure fluid to said piston-cylinder means and to the outer surface of said sleeve take place simultaneously.

3. An apparatus according to claim 2 in which the effective working area of said piston-cylinder means is greater than that of the work member formed in said compacting space.

4. An apparatus according to claim 3 which includes means to separate the lower closure member from said cylindrical member in the vertical direction to permit removal of the compacted work member from the said compacting space at the bottom thereof.

5. An apparatus according to claim 4 which includes means for moving said cylindrical member upwardly away from said lower closure member to remove the compacted work member from said compacting space.

6. An apparatus according to claim 4 which includes means for moving said cylindrical member together with said lower closure member laterally out of said working space, and an unloader member positioned to receive said lower closure member and movable downwardly to lower the lower closure member and the compacted workpiece from said cavity in said cylindrical member, whereby the lower closure member and compacted work member can be removed from said compacting space at the bottom thereof.

7. An apparatus according to claim 6 in which said cylindrical member is pivotally supported on the press frame and takes an arcuate path in moving into and out of said working space.

8. An apparatus according to claim 6 in which said cylindrical member is guided for linear motion into and out of said working space.

9. An apparatus according to claim 5 which includes rod means extending from the upper closure member to the cylindrical member to guide the cylindrical member on the closure member while permitting the closure member to move toward the cylindrical member when the press closes.

10. An apparatus according to claim 9 which includes a motor means connected between said cylindrical member and said lower closure member to move the cylindrical member upwardly relative to the lower closure member when the press is open.

11. An apparatus according to claim 10 which includes resilient means supporting said lower closure member on the press frame, said resilient means being yieldable when the cylindrical member engages said lower closure member and moves it downwardly during closing of said press.

12. An apparatus according to claim 11 which includes a ram connected to said lower closure member and extending downwardly therefrom, a cylinder in which said ram is movable, and conduit means connecting said cylinder with the outer surface of said sleeve in said cylindrical member for the supply of fluid from the cylinder thereto in response to closing of said press.

13. An apparatus according to claim 1 which includes die means inside said sleeve.

14. An apparatus according to claim 13 in which said die means includes at least one resiliently flexible member.

15. An apparatus according to claim 13 in which said die means comprises a resiliently flexible tubular member fitting in said sleeve and extending from one closure member to the other when the press is closed.

16. An apparatus according to claim 1 which includes means for controlling the rate of said pressure release.

17. An apparatus according to claim 1 in which said cylindrical member has a bore extending axially therethrough and forming the said cavity, a perforated rigid tubular element in said bore and surrounding said sleeve, said sleeve having end parts sealingly engaging the ends of said bore at the opposite ends of said tubular element, and means on the outer surface of said tubular members permitting the free flow of fluid to the outer ends of the perforations therein.

18. An apparatus according to claim 17 in which said tubular element has spaced external projections thereon engaging said bore to locate and support the element in the bore and to provide passage means around the element for the flow of fluid.

19. An apparatus according to claim 17 in which said sleeve has annular lips formed on the opposite ends on the outside and projecting backwardly along the sleeve, said lips engaging the outer surface of said element at the ends thereof and being held in sealing engagement with the said bore by the ends of said element.

20. An apparatus according to claim 19 in which said cylindrical member includes retaining rings on the opposite ends thereof engaging the ends of said sleeve and retaining said sleeve and tubular element in said bore.

21. An apparatus according to claim 12 in which said conduit means includes a passage extending upwardly axially in said ram, and a flexible conduit connecting said passage with the outer surface of said sleeve.

(References on following page)

References Cited
UNITED STATES PATENTS

| | | |
|---|---|---|
| 2,152,738 | 4/1939 | Jeffery. |
| 2,937,421 | 5/1960 | Taccone _____ 18—5X |
| 3,034,191 | 5/1962 | Schaefer et al. |
| 3,172,153 | 3/1965 | Loomis et al. _____ 18—5 |
| 3,193,900 | 7/1965 | Wendt. |

J. HOWARD FLINT, Jr., Primary Examiner

U.S. Cl. X.R.

25—45